United States Patent
Burdette

(10) Patent No.: US 8,719,130 B2
(45) Date of Patent: May 6, 2014

(54) PORTFOLIO INVESTMENT MANAGEMENT METHOD, SYSTEM AND COMPUTER PROGRAM PRODUCT

(75) Inventor: William R. Burdette, Miami, FL (US)

(73) Assignee: New Affinity Concepts Corp., Miami, FL (US)

( * ) Notice: Subject to any disclaimer, the term of this patent is extended or adjusted under 35 U.S.C. 154(b) by 87 days.

(21) Appl. No.: 12/803,273

(22) Filed: Jun. 24, 2010

(65) Prior Publication Data

US 2010/0268668 A1 Oct. 21, 2010

Related U.S. Application Data

(63) Continuation-in-part of application No. 11/204,494, filed on Aug. 16, 2005.

(51) Int. Cl.
*G06Q 40/00* (2012.01)

(52) U.S. Cl.
USPC ............. 705/35; 705/36 R; 705/37; 705/39; 705/38; 705/43; 705/44; 705/4

(58) Field of Classification Search
USPC ............................................ 705/15–45
See application file for complete search history.

(56) References Cited

U.S. PATENT DOCUMENTS

| | | | | | |
|---|---|---|---|---|---|
| 5,631,828 | A | * | 5/1997 | Hagan | 705/4 |
| 7,509,286 | B1 | * | 3/2009 | Bent et al. | 705/39 |
| 7,536,350 | B1 | * | 5/2009 | Bent et al. | 705/39 |
| 7,542,933 | B2 | * | 6/2009 | Coloma | 705/35 |
| 7,860,771 | B2 | * | 12/2010 | Colvin | 705/35 |
| 8,352,342 | B1 | * | 1/2013 | Bent et al. | 705/35 |
| 8,498,933 | B1 | * | 7/2013 | Bent et al. | 705/39 |
| 2002/0091637 | A1 | * | 7/2002 | Bent et al. | 705/40 |
| 2003/0023529 | A1 | * | 1/2003 | Jacobsen | 705/35 |
| 2005/0044038 | A1 | * | 2/2005 | Whiting et al. | 705/39 |
| 2006/0212385 | A2 | * | 9/2006 | Bent et al. | 705/38 |

OTHER PUBLICATIONS

"High-Yield CDs—Protect Your Money by Checking the Fine Print", Author/Creator: SEC; Publisher: US GOV; Publication Date: Dec. 3, 2008.*
"http://www.sungard.com/financialsystems/products/bc_funding.aspx", Online Publication, Publication Date: Jan. 1, 2000.*
Division (Mathematics); Wikipedia; Sep. 10, 2013.*
SEC, High-Yield CD's—Protect Your Money by Checking the Fine Print, Dec. 3, 2008, US GOV.
http://www.sungard.com/financialsystems/products/bc_funding.aspx, Jan. 1, 2000, Online Publication.

* cited by examiner

*Primary Examiner* — Hai Tran
(74) *Attorney, Agent, or Firm* — Mark Terry

(57) ABSTRACT

A method for an automated insured deposit portfolio management includes receiving a request from a depositor to invest funds in an insured deposit product including investment vehicles that use a combination of money market deposit accounts and CD Products, selecting a first portion of the funds for investment in at least one money market account in at least one issuer bank, and selecting a second portion of the funds for investment in at least one CD Product in at least one issuer bank. An escrow amount can be computed that compares to an early withdrawal penalty for each CD Product. Thereafter, investment of the first portion can be directed for investment in at least one money market deposit account with at least one issuer bank, and investment of the second portion can be directed in at least one CD Product with at least one issuer bank. Finally, a record of the first and second portions can be stored in connection with the depositor.

12 Claims, 4 Drawing Sheets

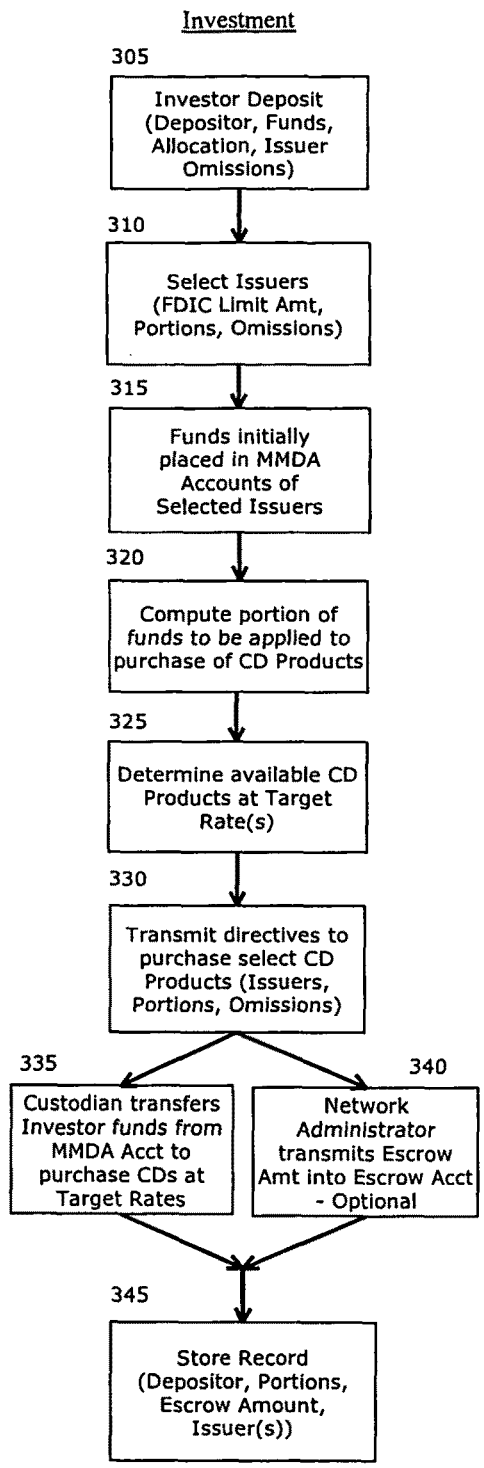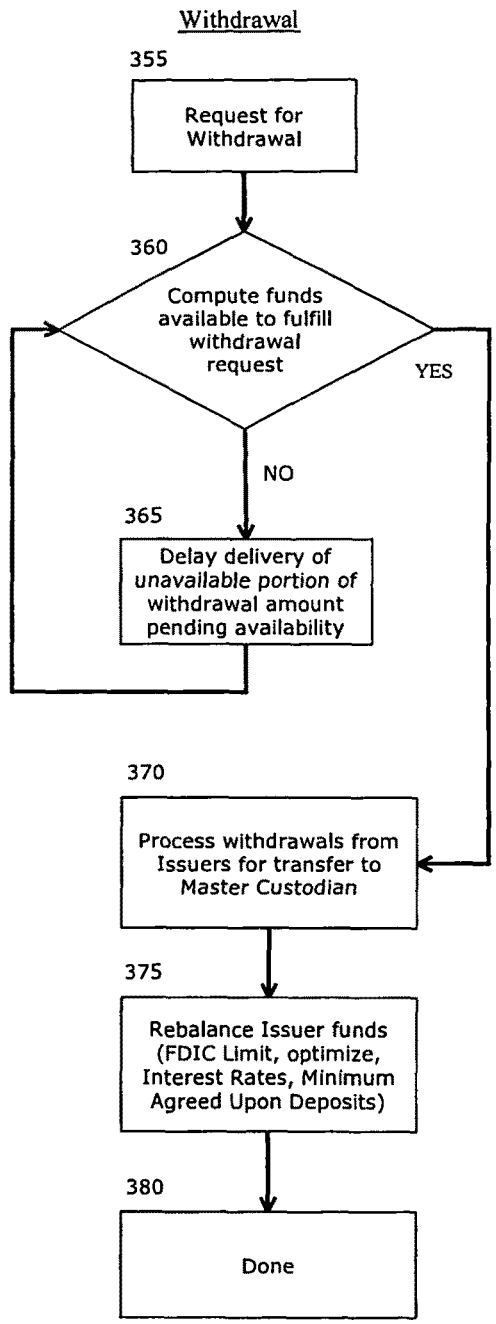
FIG. 3A  FIG. 3B

PORTFOLIO INVESTMENT MANAGEMENT METHOD, SYSTEM AND COMPUTER PROGRAM PRODUCT

REFERENCE TO CO-PENDING APPLICATIONS FOR PATENT

The present application claims priority under 35 U.S.C. §120 as a continuation-in-part of the following co-assigned U.S. Patent Application, the entire teachings of which are incorporated herein by reference herein:

U.S. application Ser. No. 11/204,494 entitled "MANAGED DEPOSIT PROGRAM", filed on Aug. 16, 2005.

BACKGROUND OF THE INVENTION

1. Field of the Invention

The present invention relates to the field of investment and deposit funding, and more particularly to the computerized management of large deposits in Federal Deposit Insurance Corporation (FDIC) insured banks and savings institutions.

2. Description of the Related Art

Under United States banking law, a bank deposit is supported by the full faith and credit of the United States Government so long as the amount of the deposit in the bank does not exceed the Federal deposit insurance limit which is currently set at two-hundred and fifty thousand dollars ($250,000) through Dec. 31, 2013. The Federal Deposit Insurance Corporation ("FDIC") is a federal governmental entity charged with implementing the foregoing guarantee by providing insurance for deposits in all Federal and State licensed banks and savings institutions in the United States.

The law and resulting administrative regulations governing the insurance of deposits within banking institutions provides FDIC s insurance coverage based on the concept of ownership rights and capacities. Specifically, funds held in different ownership categories are insured separately from each other, and funds of the same ownership but held in different accounts are subsumed under the same insurance coverage.

As a result of the limit of FDIC insurance at any one bank, investors holding funds that substantially exceed the FDIC insurance limit generally do not consider using bank deposits as an investment vehicle. In particular, the fact that larger amounts must be distributed across many different banks renders the exercise burdensome in merely opening the accounts and even more burdensome in maintaining control over and supervising the different accounts.

A network of managed deposit accounts at a multitude of FDIC insured financial institutions across the United States provides convenience to the investor by giving investors the ability to make a singled investment in the network with the administrator directing those funds to the a sufficient number of FDIC insured banks, limiting the amount at any one institution to no more than the FDIC insurance limit for each depositor, thus maintaining full FDIC insurance on all of the funds. For large investors, the alternative of investing in a traditional money market fund requires that the investor forego any United States guarantee and trust the judgment of the fund managers in selecting suitable investments since the investment vehicle is not FDIC insured.

Co-pending U.S. patent application Ser. No. 11/204,494 entitled "MANAGED DEPOSIT PROGRAM" describes a methodology, system and computer program product for achieving higher rates of return for investors while maintaining FDIC insurance for deposits that exceed $250,000. In this regard, as described therein, a network administrator agrees to a minimum level of deposits within certain preferred issuer banks in order to obtain higher rates of return on the funds committed to those preferred institutions. Insofar as the network administrator has the discretion to direct deposits to any issuer banks as long as no more than the FDIC Limit Amount is placed in any one issuer bank, then, when any depositor requests withdrawal of its funds, the network administrator has the ability to determine which banks are affected by such withdrawal and by executing a series of program algorithms the network administrator can logically manage and re-allocate ownership and distribution of funds originally placed in other issuer banks in order to ensure that the minimum agreed upon level of funds deposited at preferred issuer banks remains at the minimum agreed upon level despite the withdrawal requested by the depositor, and also achieving the highest rate of return on the funds remaining in the program.

Despite the convenience demonstrated by the technology disclosed in co-pending U.S. patent application Ser. No. 11/204,494, often times, investors seek an even higher rate of return than that offered by demand funds such as a money market account or a money market fund of money market accounts. Certificates of deposits and investment structures that include bank-issued certificates of deposit in the investment structure (collectively, "CD Products") as a means to improve an investor's return will provide a unique and novel investment while enjoying the same FDIC insurance as demand funds up to the FDIC insurance limit of $250,000. However, as it is well known, CD Products involve limited liquidity throughout the term of the CD Product and funds can only be withdrawn in connection with a penalty paid by the withdrawing investor thereby defeating the enhanced investment rate offered by the CD Product unless that limitation is addressed in the process of creating a new product.

BRIEF SUMMARY OF THE INVENTION

Embodiments of the present invention address deficiencies of the art in respect to FDIC insured investment vehicle and liquid demand fund management and provide a novel and non-obvious method, system and computer program product for automated portfolio investment management. In an embodiment of the invention, a computer implemented method for automated portfolio management is provided. The method includes receiving in a network administration data processing system a request from a depositor to deposit funds to be invested in various types of deposit investment vehicles—namely money market deposits and CD Products. The method also includes selecting a first portion of the funds for investment in money market deposits in at least one issuer bank, and selecting a second portion of the funds for investment in at least one CD Product in at least one issuer bank.

Notably, a requisite escrow amount can be computed that is comparable to an early withdrawal penalty for each CD Product associated with the second portion of the funds. Thereafter, the method can include directing investment of the selected second portion of the funds for investment in at least one CD Product with at least one of the issuer banks, directing investment of the balance of the funds in at least one money market account with at least one of the issuer banks, and directing holding of the escrow amount in an escrow account in a custodian. Finally, a record of the first and second selected portions of the funds and the escrow amount can be stored in connection with the depositor in storage of the network administration data processing system.

In one aspect of the embodiment, the method also can include generating a report accounting for a selected depositor depositing funds through the custodian an amount invested in each corresponding money market account in at least one issuer bank, and an amount invested in each CD Product in at least one issuer bank. In another aspect of the embodiment, the method also can include re-computing the escrow amount responsive to a sale of a CD Product. In yet another aspect of the embodiment, the method also can include re-computing the escrow amount responsive to a reduction in a penalty attributable to a threshold time period having passed during the term of the CD Product as the CD Product approaches maturity. In either aspect, the escrow account balance can be adjusted to reflect the re-computed escrow amount in the custodian. In even yet another aspect of the embodiment, the step of selecting the first portion of the funds for investment in money market deposits in at least one issuer bank, and selecting another portion of the funds for investment in at least one CD Product in at least one issuer bank, also includes omitting issuer banks specified by the depositor from selection for the portfolio of the depositor.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for automated portfolio investment management. In accordance with an embodiment of the present invention, funds can be deposited by different depositors in a multitude of issuer banks as directed by a network administrator through a custodian. The funds can be partitioned between both CD Products and money market accounts held by the custodian as directed by the network administrator while ensuring that no one depositor maintains more than the FDIC insurance limit (presently $250,000) in any one issuer bank. Further, each deposit of funds by a depositor can be tracked in a database to definitively identify the amount, investment vehicle type and particular issuer bank receiving the deposited funds.

Importantly, in one embodiment of the invention, an escrow amount can be computed based upon the amount of the withdrawal penalty that would be incurred in the event of an early termination of a CD Product that is purchased for an account of the depositor. The escrow amount subsequently can be placed into escrow from funds provided by the network administrator. Thereafter, fulfilling withdrawal requests by any depositor can be satisfied from early termination of the CD Product together with release of the funds held in escrow for the CD Product. In another embodiment of the invention, on a recurring periodic basis which may be daily, ownership of deposits can be re-allocated amongst the various depositors and amongst different investment vehicles—namely as between CD Products and money market deposit accounts—as changes occur in the overall portfolio with receipt of new deposits, sale or maturity of CD Products, and as existing depositors withdraw funds.

Figure 1:
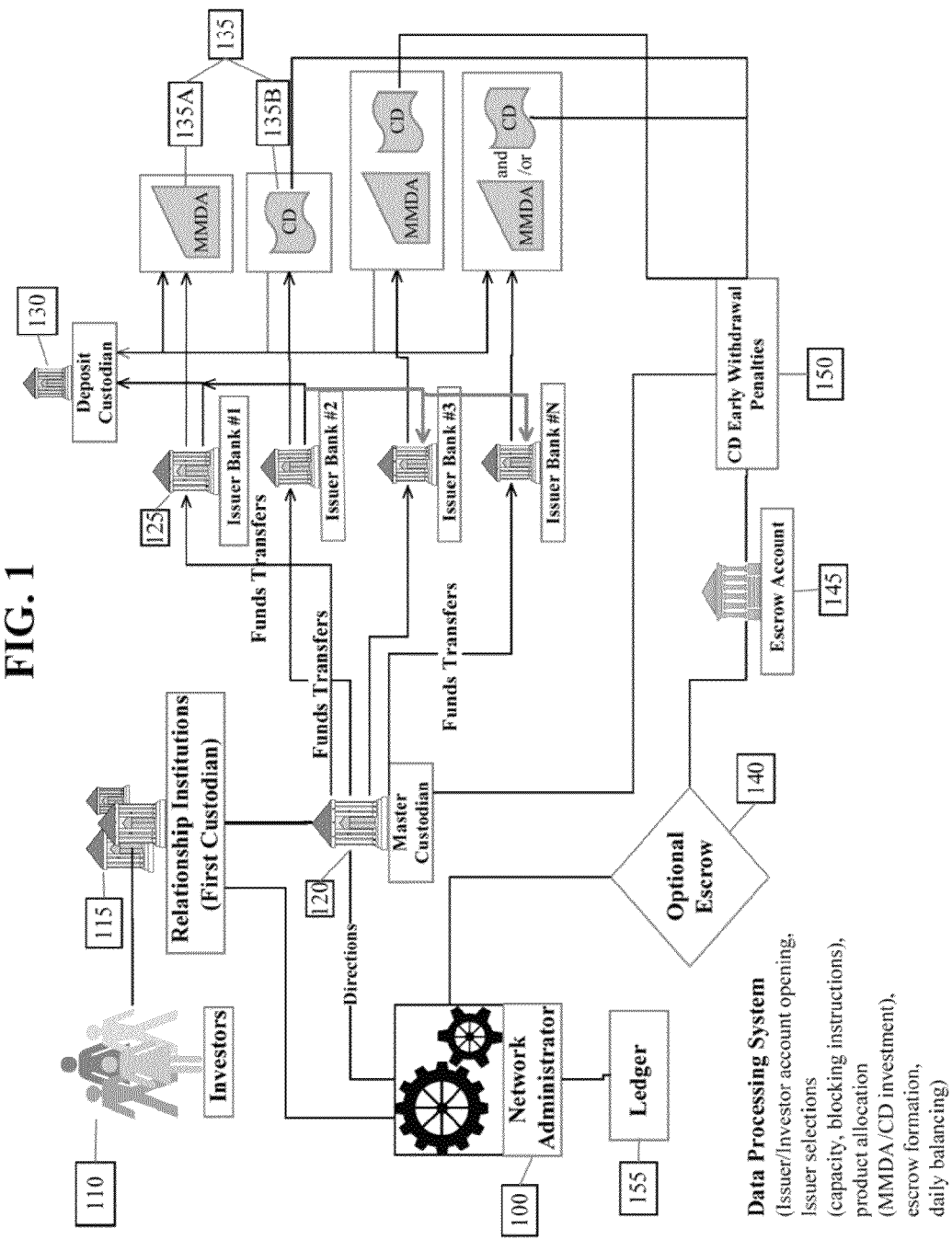
FIG. 1 is a pictorial illustration of a process for automated portfolio investment management.

In further illustration, FIG. 1 shows the process by which the funds are processed in an automated portfolio investment management system. As shown in FIG. 1, investors 110 deposit funds into a portfolio management program through a relationship institution or first custodian 115. The relationship institution 115 transfers the funds to a master custodian 120 who is engaged by administrator 100 to manage the distribution of all funds in the portfolio management program among a variety of accounts 135A, 135B held at different issuer banks 125 for the benefit of investors. Administrator 100 can use different agents as the deposit custodian 130 of the deposits placed with each of the issuer banks 125. In this regard, the deposit custodian 130 can be either the administrator 100, master custodian 120, relationship institution 115, or any other regulated financial institution engaged to act as agent for the investors 110 or administrator 100 in the portfolio management program.

Of note, the different accounts 135A, 135B can include different investment vehicles—namely money market accounts 135A and CD Products 135B. Further, the master custodian 120 serves as the central distribution point for the portfolio management program. As a liquidity assurance option, an escrow account 145 can be created to hold escrow funds 140 made available to offset any possible early withdrawal penalty that might arise on account of any premature withdrawal of deposits that have been invested in CD Products.

In operation, administrator 100 receives information on funds being invested on behalf of an investing one of the investors 110 and determines a first distribution of the funds into one or more money market deposit accounts 135A at one of more of the issuer banks 125. Subsequently, market data is obtained on the availability of suitable CD Products (for example CD Products with a term on the order of months) appropriately priced from the issuer banks 125. A proportion of the funds can be determined for use for the purchase of CD Products 135B with respect to the money market deposit accounts 135A, and a selection is made of CD Products 135B meeting the criteria (term, rate and size of investment) for CD Products to be purchased for investors 110. The master custodian 120 then releases a portion of the funds from the money market accounts 135A to purchase the selected ones of the CD Products 135B for the benefit of the investing one of the investors 110, with no more than the FDIC limit amount of deposits (including both money market accounts and CD Products) with any one of the issuer banks 125 being allocated to the account of the investing one of the investors 110.

Of note, upon designation of the funds, the administrator 100 can select one or more issuer banks 125 to receive the funds, accounting for an analysis of the FDIC Limit Amount on insured deposits, interest rates offered by each of the issuer banks 125, and any agreements made with issuer banks 125 with respect to minimum or maximum levels of deposits to be maintained with the each of the issuer banks 125. In addition, the administrator 100 can determine whether certain of the issuer banks 125 are to be omitted (blocked) from the selection process of the administrator 100 according to instructions given by the investing one of the investors 110. Thereafter, the administrator 100 can direct investment of the deposits of the investing one of the investors 110 to the different money market accounts 135A opened at selected ones of the issuer banks 125, and can apply a determined level of investment of the funds in CD Products 135B to be purchased in the name of the deposit custodian 130.

In one embodiment of the invention, in order to assure liquidity for withdrawing ones of the investors 110, administrator 100 can determine a portion of administrator funds 160 for placement as escrow funds 140 in an escrow account 145 in an amount equal to the amount of any early withdrawal penalty 150 so that none of the investors 110 are impacted by the withdrawal of funds by the investing one of the investors 110 at any time. Finally, one or more records can be written to a ledger 155 memorializing the placement of the funds for the investing one of the investors 110 in the selected issuer banks 125 in corresponding money market deposit accounts 135A and/or CD Products 135B.

Figure 2:
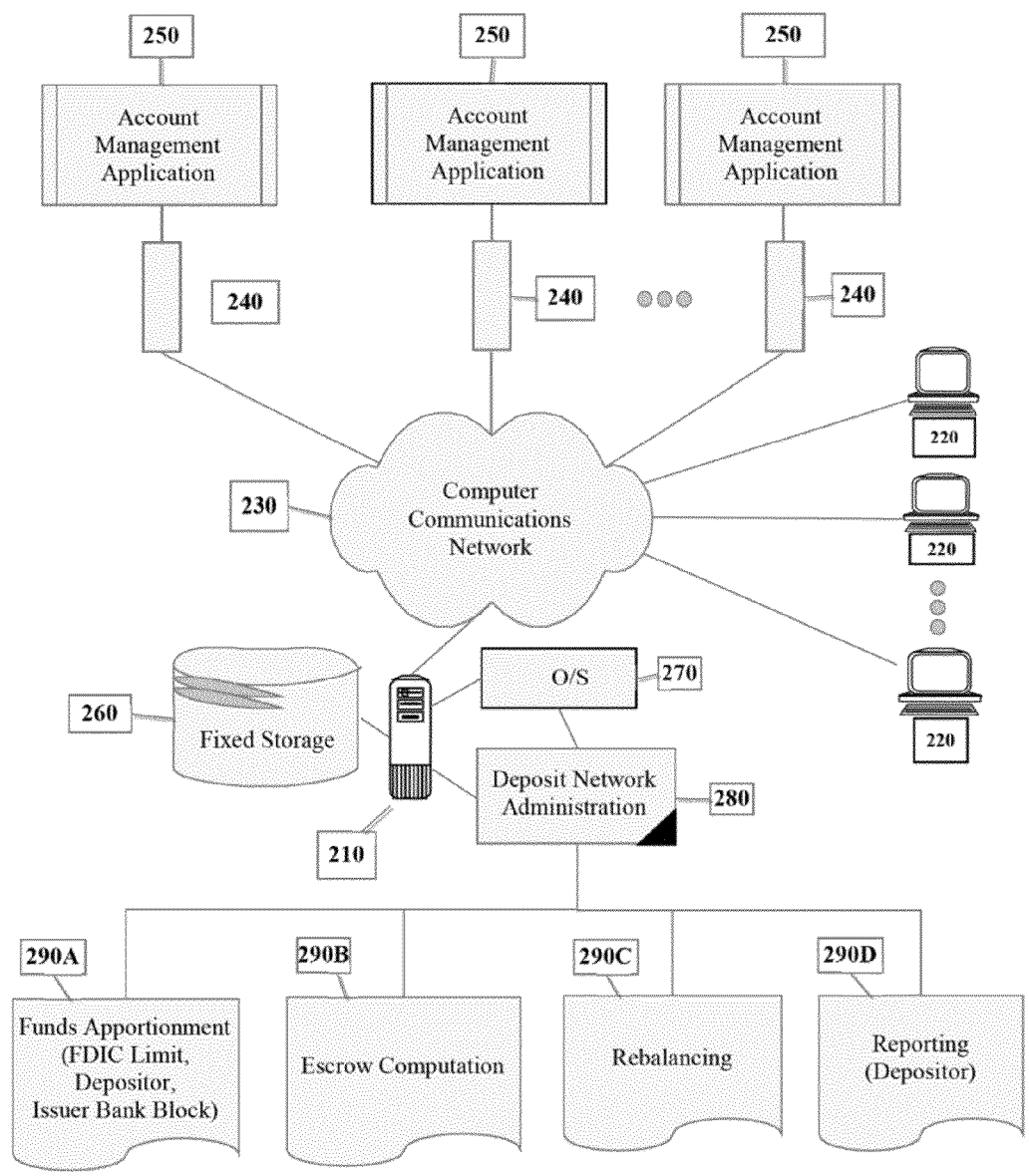
FIG. 2 is a schematic illustration of an automated portfolio investment management data processing system; and, FIGS. 3A and 3B, taken together, are a flow chart illustrating a process for automated portfolio investment management.

The process described in connection with FIG. 1 can be managed through an automated portfolio investment management data processing system. In illustration, FIG. 2 schematically depicts an automated portfolio investment management data processing system. The system can include a host server 210 hosting an operating system 270 supporting the execution of administrator logic 280 and configured for communicative coupling to different computing platforms 220 of different investors, and different computing platforms 240 for different issuer banks over communications network 230. Each of the different computing platforms 240 can include an account management application 250 providing an interface (whether a user interface or application programming interface or messaging interface) through which administrator logic 280 when executed in memory by a processor of the host server 210 can direct the management of funds deposited with the issuer banks in both CD Products and money market deposit accounts, including the depositing and withdrawal of deposits and also the purchase or sale of CD Products.

Storage 260 can be coupled to the host server 210 and can include a ledger in the form of a table, spreadsheet or database into which the administrator logic 280 can write and modify records memorializing the nature, amount and location of deposits in custodian accounts on behalf of different depositors in different issuer banks. The records in the storage 260 further can specify the type of investment vehicle—whether a CD Product or money market deposit—associated with deposited funds for each investor in the different issuer banks. As such, the administrator logic 280 in accessing the records of the storage 260 can generate reports indicating for one or more investors, the nature, amount and location of deposits held with each of the issuer banks.

The administrator logic 280 can include program code that when executed in memory by a processor of the host sever 210 through the operating system 270 can perform automated portfolio management. The program code can include different programmatic modules, specifically a funds apportionment module 290A, an escrow module 290B, a rebalancing module 290C and a reporting module 290D. The funds apportionment module 290A can include program code enabled to apportion funds directed by an investor for investment in both CD and money market deposit account investment vehicles through a custodian into a network of issuer banks. The apportionment computed by the program code of the funds apportionment module 290A can account for application of the FDIC limit amount of insurance for each investor to ensure that all deposits remain fully FDIC insured including both money market and CD deposits, and that Administrator has applied the investor's directions to exclude specific issuer banks from receiving deposits on behalf of the investor.

The program code of the escrow computation module 290B can be enabled to compute an escrow amount to ensure liquidity of the funds of an investor, with the use of the escrow funds being applied to any early withdrawal penalty arising in the event there is a need to terminate a CD Product earlier than the maturity date of the CD Product in order to return funds to the investor. The program code of the rebalancing module 290C can be enabled to rebalance funds across different issuer banks on a periodic basis (such as at the end of each banking day) in order to ensure that no allocation of deposits of any one investor exceeds the FDIC limit amount, while optimizing interest earned from different issuer banks at different interest rates on deposits, and meeting any agreed upon minimum level of deposits to be placed with any of the issuer banks. Yet further, the program code of the rebalancing logic 290C can be enabled to re-compute escrow amounts for CD Products that may be terminated to provide liquidity for any investor requesting a withdrawal of the funds of the investor. Finally, the program code of the reporting module 290D can be enabled to produce reports for investors providing an indication of the nature, amount and location of deposits in custodian accounts amongst the issuer banks.

In even yet further illustration of the operation of the program code of the administrator logic 280, FIGS. 3A and 3B, taken together, are a flow chart illustrating a process for automated portfolio investment management. Considering first FIG. 3A, a process is shown for directing the depositing of funds for an investor in both money market deposit accounts and CD Products in different accounts at different issuer banks. In block 305, a request can be received to deposit funds for an investor through the custodian into a specified allocation of one or more money market deposit accounts and then one or more CD Products. Optionally, the request can include a specification of particular issuer banks to be omitted (blocked) from receiving any portion of the funds of any particular investor.

In block 310, issuer banks can be selected to receive different portions of the funds while accounting for the issuer banks optionally specified for omission and while respecting the FDIC insurance limit amount at each of the issuer banks accounting for existing deposits of the depositor at any of the issuer banks. In block 315, the funds can first be placed in one or more money market deposit accounts of selected issuer banks. In block 320, investment directives for the funds can be applied to compute the amount of funds to be placed in CD Products. In block 325, there can be a determination of CD Products available in the marketplace at a target interest rate and in block 330, there can be a transmission of investment directives to purchase selected CD Products. In block 335, a directive can be initiated for transfer by the custodian of a portion of the funds from the money market deposit account to purchase the selected CD Products at the target rate. Concurrently, in block 340 a portion of administrator's funds can be directed for transfer into an escrow account. Finally, in block 345 a record can be written specifying the identity of the investor, the selected issuer banks, portions of funds stored in the money market deposit accounts of the selected issuer banks, the CD Products purchased for the benefit of the investor and the escrow amount.

Turning now to FIG. 3B, in block 355 a request can be received from an investor wishing to withdraw funds. In decision block 360 a determination can be made as to the availability of sufficient liquid funds (i.e., funds in money market accounts as opposed to CD Products) in order to process the full amount of the withdrawal request from either the investor's account or any other account. In block 365, if sufficient funds are not available from money market deposit assets in the investor's account then delivery of the unavailable portion of the withdrawal amount can be delayed pending availability. Once funds are determined to be available, in block 370 the withdrawals are processed from issuer banks for transfer to the master custodian. In block 375, all funds in the portfolio investment management program can be rebalanced to reflect the reduction of funds in the aggregate, the reallocation of ownership of all deposits and the distribution of deposits at issuer banks to ensure continuing FDIC insurance for the deposits, omitted issuer banks, maximization of income from those issuer banks with the most favorable interest rates, and the maintenance of minimum balances at preferred issuer banks.

Figure 4:
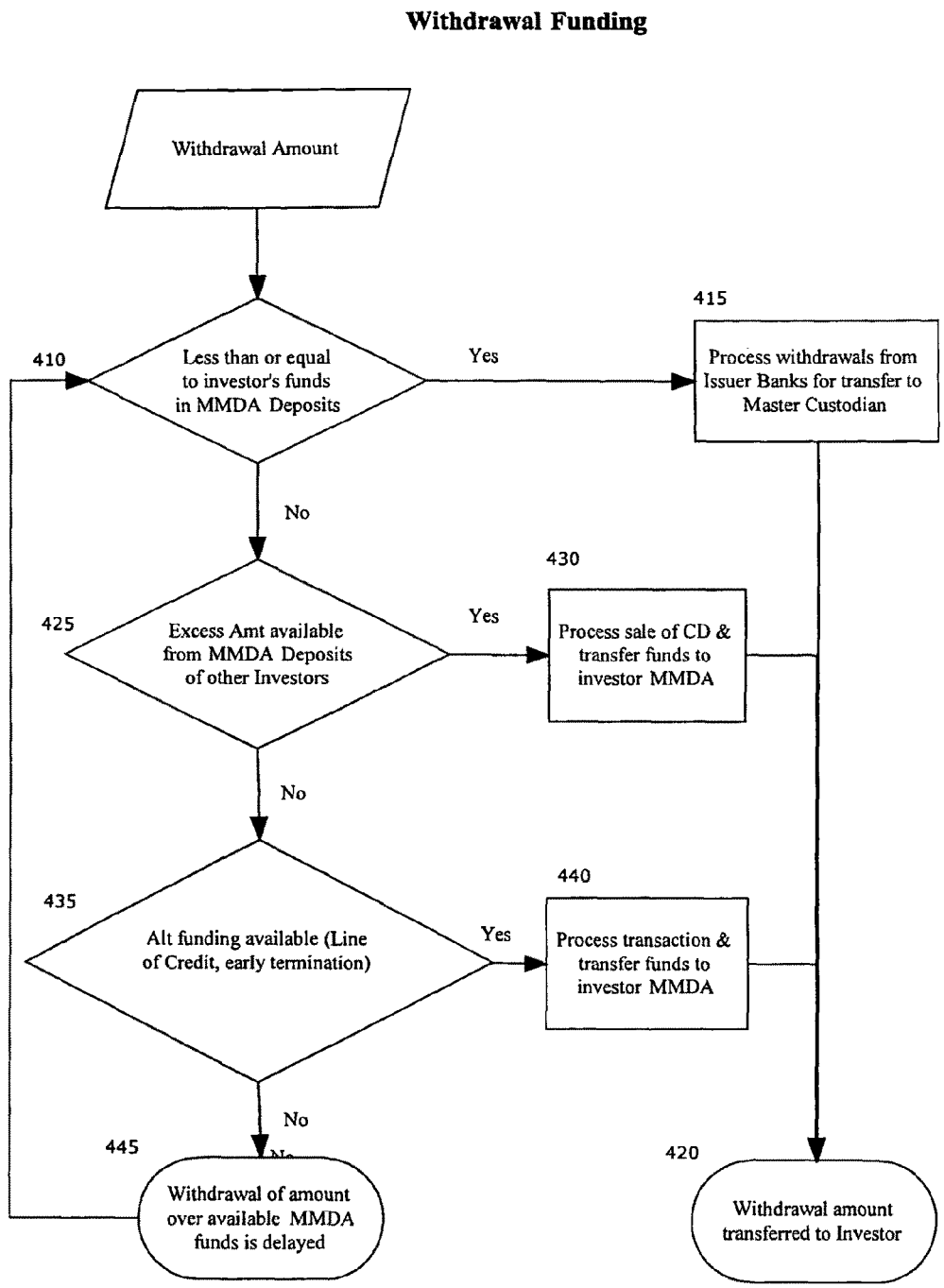
FIG. 4 is a flow chart illustrating a process for withdrawal funding.

Turning now to FIG. 4, a flow chart is shown describing a process for generating liquidity of funds to satisfy an investor withdrawal request of funds invested into the portfolio management program and in connection with the determination of block 360 of FIG. 3B. Referring to FIG. 4, in block 410, there is a determination of whether the withdrawal amount is less than or equal to the amount of funds of the investor available in money market deposit accounts held by the investor. If so, there is no need to execute any sale, transfer or termination of any CD Products held in the account of the investor in order to obtain funds to meet the investor's withdrawal request and in block 415, the requested withdrawal can be processed accordingly with funds being transferred to the investor in block 420.

Otherwise, in decision block 425, it can be determined a whether or not a "standard" source of liquidity is available in the form of funds in the money market deposit accounts of other investors in the portfolio management program that can be used to purchase a sufficient amount of CD Products of the withdrawing investor in order to generate the amount of liquid funds needed to meet the withdrawal request. If so, in block 430 a first transaction is entered transferring ownership of one or more of the CD Products held by the withdrawing investor to one or more other investors in consideration for the transfer of money market deposits into the account of the withdrawing investor, while applying all required rules for holding deposits by any investor in order to maintain full FDIC insurance and to avoid placing deposits in blocked issuer banks. Then a second transaction is processed to transfer the available liquid funds to the master custodian who in turn, transfers the funds to the withdrawing investor in block 420.

In decision block 425, if it is determined that an initial source of liquidity is not available in the form of liquid funds in the accounts of other investors sufficient to meet the request for withdrawal of the withdrawing investor, in decision block 435, it can be determined whether or not alternative methods of creating liquidity are available. Those alternative methods include: (i) the administrator using a line of credit available to the administrator to purchase CD Products from the withdrawing investor's account, or (ii) the administrator using funds of the administrator to satisfy the costs of terminating the CD Products in the account of the withdrawing investor; or (iii) transfer to an issuer bank of ownership of the CD Products in the account of the withdrawing investor, approximately concurrently with funding to the issuer bank of deposits in an amount equal to the amount of the CD Products so purchased by the issuer bank. In each case, funds equal to the amount of the CD Products in the account of the withdrawing investor will be generated without the investor losing any amount due to the withdrawing investor and the funds resulting therefrom can be made available in block 440 to meet the request of the withdrawing investor request for withdrawal of funds. Otherwise, the withdrawal of funds requested by the withdrawing investor can be delayed in block 445.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method on a computer for managing deposits for a plurality of customers, comprising:

storing, in a database, for each of a plurality of issuer banks that have entered into a minimum funds agreement with an administrator, a minimum funds agreement defining defines a minimum level of deposits required for an issuer bank and an interest rate to be paid on deposits placed with said issuer bank when said minimum level of deposit is maintained by a depositor;

receiving from a customer, via a financial network, a deposit amount exceeding a governmental insurance limit;

calculating, by the computer, a plurality of sub-deposit amounts wherein each sub-deposit amount is equal to or less than the governmental insurance limit;

defining, by the computer, a plurality of sub-deposits, wherein each of the plurality of sub-deposits is comprised of one of the plurality of sub-deposit amounts;

selecting one or more issuer banks from the plurality of issuer banks, and selecting a money market account and a CD product from the one or more issuer banks into which to place the plurality of sub-deposits, wherein the one or more issuer banks are selected based on an interest rate offered by the one or more issuer banks, according to a corresponding minimum funds agreement with the administrator;

transferring, via the financial network, each of the plurality of sub-deposits to a corresponding one of the money market account and the CD product that were selected, wherein each sub-deposit is governmentally insured in its entirety;

automatically recording, in the database, each transfer of a sub-deposit to the money market account and the CD product for the customer;

receiving from the customer, via the financial network, a withdrawal amount exceeding a first amount equaling a sum of all sub-deposits of the customer that have been transferred to the money market account, wherein the first amount summed with a second amount equals the withdrawal amount;

identifying one or more CD products with sub-deposits of the customer that are substantially equal the second amount, wherein a maturity date of the one or more CD products is not currently reached;

exchanging ownership of the one or more CD products that were identified from the customer to a second customer and transferring a deposit substantially equal to the second amount from the second customer to the customer;

automatically recording, in the database, the transfer of the one or more CD products from the customer to the second customer;

withdrawing, via the financial network, all sub-deposits of the customer that have been transferred to the money market account; and withdrawing, via the financial network, the deposit substantially equal to the second amount, such that the customer receives the deposit for the one or more CD products that were identified without experiencing an early withdrawal penalty.

2. The method of claim 1, wherein the step of receiving from a customer a deposit amount further comprises:
receiving from a customer, via a financial network, an identification of one or more issuer banks in which the customer's funds shall not be deposited.

3. The method of claim 2, wherein the step of selecting one or more issuer banks further comprises:
selecting one or more issuer banks from the plurality of issuer banks, wherein the one or more issuer banks are selected by taking into account the identification of one or more issuer banks in which the customer's funds shall not be deposited.

4. The method of claim 3, further comprising:
generating an escrow account to apply to early withdrawal penalties for terminating a CD product before a maturity date for the CD product.

5. A computer system for managing deposits for a plurality of customers, the computer system comprising a database and a processor connected to said database, wherein the processor is configured for:
storing, in the database, for each of a plurality of issuer banks that have entered into a minimum funds agreement with an administrator, a minimum funds agreement defining a minimum level of deposits required for an issuer bank and an interest rate to be paid on deposits placed with said issuer bank when said minimum level of deposit is maintained by a depositor;

receiving from a customer, via a financial network, a deposit amount exceeding a governmental insurance limit;

calculating, by the computer, a plurality of sub-deposit amounts wherein each sub-deposit amount is equal to or less than the governmental insurance limit;

defining, by the computer, a plurality of sub-deposits, wherein each of the plurality of sub-deposits is comprised of one of the plurality of sub-deposit amounts;

selecting one or more issuer banks from the plurality of issuer banks, and selecting a money market account and a CD product from the one or more issuer banks into which to place the plurality of sub-deposits, wherein the one or more issuer banks are selected based on an interest rate offered by the one or more issuer banks, according to a corresponding minimum funds agreement with the administrator;

transferring, via the financial network, each of the plurality of sub-deposits to a corresponding one of the money market account and the CD product that were selected, wherein each sub-deposit is governmentally insured in its entirety;

automatically recording, in the database, each transfer of a sub-deposit to the money market account and the CD product for the customer;

receiving from the customer, via the financial network, a withdrawal amount exceeding a first amount equaling a sum of all sub-deposits of the customer that have been transferred to the money market account, wherein the first amount summed with a second amount equals the withdrawal amount;

identifying one or more CD products with sub-deposits of the customer that are substantially equal the second amount, wherein a maturity date of the one or more CD products is not currently reached;

exchanging ownership of the one or more CD products that were identified from the customer to a second customer and transferring a deposit substantially equal to the second amount from the second customer to the customer;

automatically recording, in the database, the transfer of the one or more CD products from the customer to the second customer;

withdrawing, via the financial network, all sub-deposits of the customer that have been transferred to the money market account; and withdrawing, via the financial network, the deposit substantially equal to the second amount, such that the customer receives the deposit for the one or more CD products that were identified without experiencing an early withdrawal penalty.

6. The computer system of claim 5, wherein the step of receiving from a customer a deposit amount further comprises:
receiving from a customer, via a financial network, an identification of one or more issuer banks in which the customer's funds shall not be deposited.

7. The computer system of claim 6, wherein the step of selecting one or more issuer banks further comprises:
selecting one or more issuer banks from the plurality of issuer banks, wherein the one or more issuer banks are selected by taking into account the identification of one or more issuer banks in which the customer's funds shall not be deposited.

8. The computer system of claim 7, the processor further configured for:
 generating an escrow account to apply to early withdrawal penalties for terminating a CD product before a maturity date for the CD product.

9. A non-transitory computer readable storage medium having stored thereon a computer program for managing deposits for a plurality of customers, the computer program comprising a routine set of instructions which when executed by the computer causes the computer to perform the steps of:
 storing, in a database, for each of a plurality of issuer banks that have entered into a minimum funds agreement with an administrator, a minimum funds agreement defining defines a minimum level of deposits required for an issuer bank and an interest rate to be paid on deposits placed with said issuer bank when said minimum level of deposit is maintained by a depositor;
 receiving from a customer, via a financial network, a deposit amount exceeding a governmental insurance limit;
 calculating, by the computer, a plurality of sub-deposit amounts wherein each sub-deposit amount is equal to or less than the governmental insurance limit;
 defining, by the computer, a plurality of sub-deposits, wherein each of the plurality of sub-deposits is comprised of one of the plurality of sub-deposit amounts;
 selecting one or more issuer banks from the plurality of issuer banks, and selecting a money market account and a CD product from the one or more issuer banks into which to place the plurality of sub-deposits, wherein the one or more issuer banks are selected based on an interest rate offered by the one or more issuer banks, according to a corresponding minimum funds agreement with the administrator;
 transferring, via the financial network, each of the plurality of sub-deposits to a corresponding one of the money market account and the CD product that were selected, wherein each sub-deposit is governmentally insured in its entirety;
 automatically recording, in the database, each transfer of a sub-deposit to the money market account and the CD product for the customer;
 receiving from the customer, via the financial network, a withdrawal amount exceeding a first amount equaling a sum of all sub-deposits of the customer that have been transferred to the money market account, wherein the first amount summed with a second amount equals the withdrawal amount;
 identifying one or more CD products with sub-deposits of the customer that are substantially equal the second amount, wherein a maturity date of the one or more CD products is not currently reached;
 exchanging ownership of the one or more CD products that were identified from the customer to a second customer and transferring a deposit substantially equal to the second amount from the second customer to the customer;
 automatically recording, in the database, the transfer of the one or more CD products from the customer to the second customer;
 withdrawing, via the financial network, all sub-deposits of the customer that have been transferred to the money market account; and
 withdrawing, via the financial network, the deposit substantially equal to the second amount, such that the customer receives the deposit for the one or more CD products that were identified without experiencing an early withdrawal penalty.

10. The non-transitory computer readable storage medium of claim 9, wherein the step of receiving from a customer a deposit amount further comprises:
 receiving from a customer, via a financial network, an identification of one or more issuer banks in which the customer's funds shall not be deposited.

11. The non-transitory computer readable storage medium of claim 10, wherein the step of selecting one or more issuer banks further comprises:
 selecting one or more issuer banks from the plurality of issuer banks, wherein the one or more issuer banks are selected by taking into account the identification of one or more issuer banks in which the customer's funds shall not be deposited.

12. The non-transitory computer readable storage medium of claim 11, further comprising a routine set of instructions which when executed by a machine causes the machine to perform the step of:
 generating an escrow account to apply to early withdrawal penalties for terminating a CD product before a maturity date for the CD product.

* * * * *